United States Patent Office 3,044,987
Patented July 17, 1962

3,044,987
SEGMENTED COPOLYMERS AND PROCESS
FOR PREPARING SAME
John Raymond Schaefgen, Wilmington, Del., and Joseph Clois Shivers, Jr., West Chester, Pa., assignors to E. I. du Pont de Nemours and Company, Wilmington, Del., a corporation of Delaware
No Drawing. Filed Aug. 5, 1958, Ser. No. 753,195
15 Claims. (Cl. 260—75)

This application is a continuation-in-part of our co-pending application Serial No. 485,294, filed January 31, 1955, now abandoned.

This invention relates to a new class of linear nitrogen-containing copolymers and especially to the elastic products obtained from certain of these compositions. This invention also relates to films and other shaped articles particularly filaments, prepared from these copolymers.

Attempts are constantly being made to improve polymers utilized in such end-use applications as fibers, filaments, bristles, films, woven and non-woven fabrics, felts, papers, molded objects, and the like. For example, intense efforts have been made in recent years to improve the dyeability and the wearing comfort of the synthetic fibers. One approach has been to attempt to modify suitably the properties of the polymers which have gained commercial acceptance. A more difficult but potentially more fruitful long range approach is to synthesize new polymers free of the deficiencies of those now available. There is a particular need in textile and allied fields for a synthetic material to replace rubber, which, in textile applications, has a number of disadvantages that tend to offset its desirable elastic properties. It is, therefore, desirable to find a new material which is highly elastic, has a higher modulus and is more abrasion resistant than rubber, but which does not possess its undersirable characteristics.

An object of this invention, therefore, is to provide new synthetic materials capable of being formed into shaped articles, such as filaments, bristles, fibers, films, molded objects, papers, felts, and similar structures. Another object is to provide linear synthetic polymers, which are particularly adapted to the preparation of filaments, especially those with high elastic recovery. A further object is to provide polymers which are suitable for replacing rubber in textile applications but which are substantially free of the disadvantages that rubber has in this field. Another object is to prepare copolymers which have both a high polymer melt temperature and a low second order transition temperature. A further object is to provide methods for preparing these polymers. These and other objects will be evident from the following discussion.

The objects of this invention are accomplished by utilizing rapid, smooth polymerization techniques which produce segmented, substantially linear polymers of the desired chemical composition and physical characteristics. As will be seen, the segmented, substantially linear polymer is made up of first and second segments connected through through ester linkages, said first segment being a polymer melting below 50° C. and having a molecular weight above about 600, said second segment being at least one repeating unit of an intralinear nitrogen-containing non-bisureylene polymer having a melting point above about 200° C. in its fiber-forming molecular weight range. Thus, the segmented polymer is a linear polymer having nitrogens in the chain, but no two adjacent nitrogens, and being made up of high melting or "hard" segments having non-bisureylene nitrogen atoms in the form of urea thiourea, amide, thioamide, urethane, or thiourethane groups, which "hard" segments are chemically bonded by ester groups to low melting or "soft" segments.

The segmented polymers of this invention may be represented by the following formula

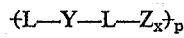

wherein Y represents the soft segment, being the residue on removal of the functional groups from a difunctional polymer with a molecular weight over 600 and a melting point below 50° C., such as HO—Y—OH, ClCO—Y—COCl, and HOOC—Y—COOH; L is the linking ester group, —COO—; $Z_x$ is the hard segment, in which Z is the repeating unit of a polyamide having recurring —CO—NH— groups in the polymer chain, or of a polyurea having recurring —NH—CO—NH— groups in the polymer chain, or of a polyurethane having recurring —O—CO—NH— groups in the polymer chain (in each case the recurring groups are connected to carbon atoms of the polymer chain); $x$ is a number not less than one; and $p$ is a large whole number.

More particularly, the polymers of this invention are substantially linear segmented copolymers consisting of a multiplicity of intralinear segments of two classes connected by ester linkages. The segments of the first class are the residues remaining after removal of the terminal functional groups of a difunctional polymer having a melting point below about 50° C. and a molecular weight above about 600. The segments of the second class contain at least one repeating unit of a fiber-forming polymer having a melting point above about 200° C. in the fiber-forming molecular weight range. The repeating unit may be represented by the formula —B—Q—A—Q—, wherein —A— and —B— are bivalent organic radicals. Bivalent organic radical —A— contains terminal nitrogen atoms, and Q is a bivalent radical selected from the group consisting of

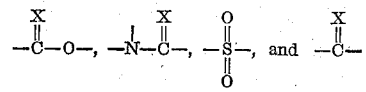

At least some of the segments of the first class are connected by ester linkages selected from the group consisting of

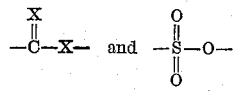

to the terminal carbon atoms of segments of the second class. In the formulas, X is selected from the group consisting of oxygen and sulfur. The copolymers are free of nitrogen-to-nitrogen bonds in the polymer chain, i.e., in particular, they are free of bis-ureylene groups.

The techniques that can be used for preparing the polymers may be melt, solution, and interfacial polymerizations. The physical make-up of the segmented polymer is such that it has a high melt temperature and a low second order transition temperature. This is the first time polymers of the type described herein and having these characteristics have been prepared. Physically, the polymer is composed of at least two segments: one segment which is high melting and represents one or more repeating units of a polyamide, polyurethane, or polyurea which melts above 200° C. in the fiber-forming molecular weight range (about 10,000 or higher) and the second segment, chemically bonded to the first, which is also polymeric in nature but has a melting point below about 50° C. In some instances the presence of these segments is shown graphically in the X-ray diffraction patterns and studies of the polymers of this invention. The segments can be readily selected from a large list of known polymers or components thereof, the melting points and crystalline characteristics of which are known or are readily determined. It is not necessary to start with such polymers and, in fact, the monomers are generally used, these monomers being condensed in any desired sequence. Since the final products contain polymeric sections derived from different chemical structures, they are copolymers. The amounts of the components are regulated and the elastomers which result are very readily shaped into elastic filaments.

Thus, the process of this invention involves reacting at least two difunctional monomers, one of which monomers has reactive end groups containing nitrogen, to form a segment of a high melting polymer which segment has reactive end groups. These are reacted with a low melting, low molecular weight difunctional polymer. The resultant linear nitrogen-containing polymers comprise an intralinear nitrogen-containing segment in which there are no two adjacent nitrogens derived from a high melting polymer and a second segment derived from a low melting polymer, the segments being bonded by ester linkages.

This invention embraces non-bisureylene polymers containing (1) units or segments of an amide, a urethane, or a urea polymer or copolymer and their thio derivatives in which at least one oxygen is replaced by sulfur, which in the non-segmented state has a polymer melt temperature above 200° C. in the fiber-forming molecular weight range, chemically united through ester linkages to (2) a difunctional polymer with a molecular weight above about 600 (preferably between about 800 and about 5000) and a melting point below about 50° C. The term "amide" includes both carbonamide and sulfonamide.

One of the monomers used to produce the "hard" segment (1) will generally be a diamine. The divalent organic radicals derived by removing one hydrogen atom from each of the nitrogen atoms of these diamines represents less than 50% of the total number of divalent organic radicals in the entire copolymer composition. Usually, the products of composition (1) will be homopolymers, but many monomers leading to copolymers are suitable. The macromolecular difunctional polymer (2) will have hydroxyl, carboxyl, or acid halide ends, preferably hydroxyl ends, and the copolymers of this invention are prepared under conditions such that the macromolecule will always be chemically united to the other component by means of an ester linkage. If the macromolecule does not have in its readily available form end groups capable of forming the desired ester linkage with the end groups in the "hard" segment, appropriate end groups are easily obtained through reaction with a diacid chloride or a glycol, depending upon the nature of the end group of the molecule to be used as the macromolecule. Component (2) is also usually a homopolymer, but frequently it is desirable to use a copolymer to modify the melting or solubility or other characteristics.

Compositions which contain about 10% to about 40% by weight of the high melting segment or, conversely, about 60% to about 90% of the segment derived from the macromolecule will be elastomers. The processes described herein can be used for making polymers outside this range but the filaments therefrom, although useful, are not the preferred elastic filaments described in the following paragraph. It has been found that the best elastomers are produced when the difunctional macromolecule, for example, a polyether glycol or its ester-forming derivative, forms a segment which is substantially amorphous at room temperature as determined by X-ray characterization. Elastomers yielding fibers having a fiber-stick temperature above 150° C. are preferred for filament formation.

The elastic compositions of this invention show high elastic recovery (above 90%), low stress decay (below 20%), and frequently have a higher modulus than rubber, which is the nearest known equivalent in terms of elastic properties. Elastic recovery or tensile recovery is the percentage return to the original length within one minute after the tension has been released from a sample which has been elongated 50% at the rate of 100 percent per minute and held at 50% elongation for one minute.

Stress decay is the percent loss in stress in a yarn one minute after it has been elongated to 50% at the rate of 100% per minute.

The "hard" segment or high melting component of the segmented polymers is made up of units of a polymer, but as has been indicated previously, it is not essential that this be a homopolymer. The high melting component may be made of one type of unit or a majority of one type; in the latter event there may be present one or more of the other types of amide, urea, or urethane polymeric units. The units in the chain may be distributed in such a manner that no single type represents a majority. The essential feature is that the combination of units must have a melting point above 200° C. when the molecular weight is high enough to be in the fiber-forming range. Usually, high-melting polymers are obtained most readily when homopolymers are prepared and these are preferred. The preferred chain length of the "hard" segment depends upon the melting point of the high melting component and also, to some extent, upon the molecular weight of the macro-intermediate. As the chain length decreases, it is preferable that the "hard" segment be a unit of a higher melting polymer, in order to obtain the desirable properties associated with the polymers of this invention. This is particularly true for the elastic compositions. When the chain length of the high melting component is reduced to the minimum (i.e., the macromolecular segments are separated by a single unit of the polymer), it is preferred that it be the repeating unit of a polymer with a melting point above 250° C. in the fiber-forming molecular weight range.

The difunctional marcointermediate may be a homopolymer or a copolymer. The most essential features are that it be difunctional and have a melting point below about 50° C. These micromolecules may contain a single type of linkage, such as the ether linkages in the poly(alkylene oxide) glycols or the ester linkages in polyesters or they may have more than one type of linkage, as in the polyoxathiaalkylene glycols. Even where the linkages are the same, the compositions may be copolymers, such as a copolyester or a copolyether. Copolymer formation is a useful method for modifying a difunctional marcomolecule which melts too high to be useful in the process. Copolymers usually melt lower and show less tendency to produce undesirable crystallization in this segment of the final copolymer than do the homopolymers from which they are derived.

These macrointermediates may have any type of end groups, as long as they are capable of reacting with one of the monomeric constituents of the high melting component to form an ester linkage. For example, the end groups may be hydroxyls, acid halides, acids, etc. It is preferred that both ends of this molecule be the same, since reaction conditions are more complicated when they differ. Furthermore, only small amounts of other linkages between the segments other than ester, such as the urethane linkage, should be present in the final copolymer. One of the advantages of the products of this invention is that they contain the more stable ester group between the macrointermediate and the high-melting component, rather than the urethane group. This makes it possible to melt spin many of the compositions of the invention. Polyethers, N-alkylated polyurethanes, and certain polyesters have been found to be the most satisfactory macrointermediates for elastomers.

A number of combinations can be made to produce the structures and compositions of this invention. Some of these are illustrated in the following generalized examples.

(1) A macroglycol (e.g., polyether or polyester) plus a diacid halide plus a low molecular weight diamine to produce an amide "hard" segment connected to the macrointermediate through ester linkages. (2) A macroglycol plus 2 mols of a diacid halide followed by reaction with a diamine and a bis(haloformate) to produce a urethane "hard" segment connected to the macrointermediate through ester linkages. (3) A macroglycol plus 2 mols of a diacid halide followed by reaction with a diamine and a biscarbamyl halide of a diamine to produce a urea "hard" segment connected to the macrointermediate through ester linkages. In the preceding and hereinafter, the term "diacid halide" is intended to include carbonyl and sulfonyl halides.

The scope of the invention is readily understood by referring to the following examples which are given for illustrative purposes only and should not be considered to represent the limits of the invention.

*Example I*

Poly(tetramethylene oxide) glycol (114 grams) with a molecular weight of 3230 was dissolved in 400 ml. of benzene and approximately 50 ml. of benzene distilled off to remove any water. Adipyl chloride (16.17 grams) was added and the two ingredients allowed to react at room temperature for approximately 72 hours under an atmosphere of nitrogen. The reaction was evacuated to remove hydrogen chloride until 147 grams of a solution containing poly(tetramethylene) diester with acid chloride ends derived from the adipyl chloride.

The solution obtained above (23.59 grams) was mixed with 8.65 grams of adipyl chloride and 200 ml. of dioxan. Hexamethylene diamine (13.60 grams) was dissolved in 100 ml. of dioxan containing 0.32 gram of an antioxidant, and the two solutions combined rapidly with vigorous stirring. An 84% yield of a polymer with an inherent viscosity of 1.43 and a polymer melt temperature of approximately 240° C. was obtained. This copolyamide ester contained 40% by weight of hexamethylene adipamide units and 60% by weight of ester units derived from the reaction of poly(tetramethylene oxide) glycol with adipyl chloride. The polymer was melt spun at 244° C. After being drawn 4×, heat-set, and boiled off, the resulting filaments had a tenacity of 0.46 g.p.d., an elongation of 540%, a stress decay of 15%, and a tensile recovery of 94%.

*Example II*

Poly(tetramethylene oxide) glycol (100 grams) with a molecular weight of 1095 was dissolved in 350 ml. of benzene and 50 ml. of benzene distilled off to remove water. Adipyl chloride (41.8 grams) was added and allowed to react for approximately 48 hours at room temperature under an atmosphere of nitrogen. Benzene and hydrogen chloride were removed under vacuum until the residual solution weighed 220 grams.

This solution (51.98 grams) was mixed with 1.11 grams of adipyl chloride and 250 ml. of dioxan. Hexamethylene diamine (9.36 grams) was dissolved in 100 ml. of dioxan containing 0.35 gram of a commercial antioxidant, and the two solutions were combined rapidly with efficient mixing. A polymer with an inherent viscosity of 1.48 was obtained in 91% yield. This copolyamide contained 25% by weight of hexamethylene adipamide units and 75% by weight of the ester units of the preceding example.

The polymer was melt spun at 216° C. After being drawn 6× and heat-set, the filaments had a tenacity of 0.43 gram per denier, an elongation of 730%, a stress decay of 9%, and a tensile recovery of 97%.

*Example III*

Poly(tetramethylene oxide) glycol (107 grams) with a molecular weight of 1095 was dissolved in 300 ml. of benzene and 50 ml. of benzene distilled off to remove water. Adipyl chloride (23.8 grams) was added and the reaction allowed to continue for 48 hours at room temperature under a nitrogen atmosphere. Benzene and hydrogen chloride were removed under reduced pressure until the residual solution weighed 175 grams.

This solution (40.25 grams) was mixed with 4.34 grams of adipyl chloride and 250 ml. of dioxan. Hexamethylene diamine (7.61 grams) was dissolved in 100 ml. of dioxan containing 0.35 gram of an antioxidant. The two solutions were mixed rapidly with efficient stirring and a polymer with an inherent viscosity of 1.63 was obtained in 89% yield. This copolyamide ester contained 20% by weight of hexamethylene adipamide units and 80% by weight of polyester "trimer" units. Because of the molar ratio used in the first step, a macromolecular diacid chloride with the average structure

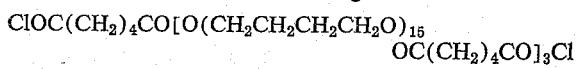

is obtained instead of the "monomer" of the preceding example which has the structure

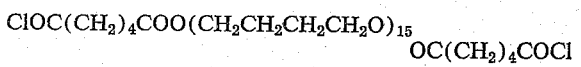

The polymer was melt spun at 233° C. and after being drawn 4.5× the filaments had a tenacity of 0.27 g.p.d., an elongation of 940%, a stress decay of 9%, and a tensile recovery of 92%. Heat-setting did not alter the properties appreciably.

*Example IV*

Poly(tetramethylene oxide) glycol (103 grams) with a molecular weight of 1095 was dissolved in 200 ml. of benzene and 50 ml. of benzene distilled off to remove water. Hexahydroterephthaloyl chloride (26.2 grams) was added and the reaction mixture handled in a manner similar to the preceding experiment. The reaction residue weighed 174 grams. This product had an average composition corresponding to the ester "trimer."

This solution (46.9 grams) was mixed with 6.30 grams of adipyl chloride and 250 ml. of dioxan. Hexamethylene diamine (10.5 grams) was dissolved in 160 ml. of dioxan containing 0.41 gram of an antioxidant and the two solutions mixed rapidly with efficient stirring. A polymer with an inherent viscosity of 1.60 and a polymer melt temperature of 235° C. was obtained in 96% yield. This copolyamide ester contained 19% by weight of hexamethylene adipamide units and 81% by weight of polyester units derived from the reaction of poly(tetramethylene oxide) glycol with hexahydroterephthaloyl chloride.

The polymer was melt spun at 240° C. The undrawn filaments had a tenacity of 0.20 g.p.d., an elongation of 1300%, a stress decay of 6%, and a tensile recovery of 93%.

*Example V*

A low melting polyester with hydroxyl ends having a molecular weight of approximately 3000 was prepared by reacting alpha-ethyl suberyl chloride with an excess of 1,4-butanediol in molten form at temperatures of 218° C. to 265° C. The ratio of hydroxyl to acid chloride end groups in the polymer was approximately 350:1. This polyester glycol was converted to a diacid chloride by reaction with an amount of terephthaloyl chloride slightly in excess of 2 mols per mol of the glycol. This diacid chloride (30 grams) was dissolved in 115 ml. of methylene chloride and reacted with vigorous stirring in a Blendor with 75 ml. of an aqueous phase containing 5.27 grams of hexamethylene diamine and 7.6 grams of sodium carbonate. After stirring had continued for approximately one minute, 5.19 grams of terephthaloyl chloride dissolved in 110 ml. of methylene chloride was added and stirring continued until a polymer with an inherent viscosity of 0.80 and a polymer melt temperature above 350° C. was obtained. It contained 20% by weight of hexamethylene terephthalamide units and 80% by weight of the low melting copolyester segments.

Film strips obtained by casting m-cresol solutions of this polymer had the following properties: tenacity=0.32 g.p.d., elongation=300%, initial modulus=0.3 g.p.d., stress decay=15%, and tensile recovery=90%. The film had a water adsorption of approximately 10%.

Example VI

The polyester diacid chloride of Example V (9.72 grams) dissolved in 100 ml. of methylene chloride was reacted by stirring vigorously in a Blendor with 100 ml. of an aqueous phase containing 9.72 grams of bis(p-aminocyclohexyl) methane and 9.8 grams of sodium carbonate. After stirring for one minute, 8.51 grams of terephthaloyl chloride dissolved in 100 ml. of methylene chloride was added and stirring continued until a polymer with an inherent viscosity of 1.22 and a polymer melt temperature of 320° C. was obtained. This copolyamide contained 20% by weight of methylenebis(p-cyclohexylene) terephthalamide units and 80% by weight of the low melting polyester units. Film strips obtained by casting m-cresol solutions of this polymer had a tenacity of 0.41 g.p.d., an elongation of 300%, an initial modulus of 0.60 g.p.d., and a stress decay of 20%.

Example VII

A low molecular weight polyester with hydroxyl ends having a molecular weight of approximately 3200 was prepared by substituting beta-ethyl suberyl chloride for the alpha-ethyl suberyl chloride of the preceding examples. This macroglycol was provided with terephthaloyl acid chloride end groups in the same manner. This acid chloride (30 grams) dissolved in 115 ml. of methylene chloride was reacted by stirring vigorously with 75 ml. of an aqueous phase containing 5.27 grams of hexamethylene diamine and 7.6 grams of sodium carbonate. After stirring had continued for approximately one minute, 5.19 grams of terephthaloyl chloride dissolved in 110 ml. of methylene chloride was added and stirring continued until a polymer with an inherent viscosity of 0.83 and which did not melt when heated up to 350° C. was obtained. This polymer contained 78% by weight of low melting polyester units. Film strips obtained by casting m-cresol solutions of this polymer had a tenacity of 0.35 g.p.d., an elongation of 325%, an initial modulus of 0.32 g.p.d., and a stress decay of 17%.

Example VIII

The polyester diacid chloride (15 grams) from Example VII dissolved in 115 ml. of methylene chloride was reacted by mixing vigorously in a Blendor with 75 ml. of an aqueous solution containing 9.72 grams of bis(p-aminocyclohexyl) methane and 9.8 grams of sodium carbonate. After mixing for approximately one minute, 8.51 grams of terephthaloyl chloride dissolved in 110 ml. of benzene was added and mixing continued until a polymer with an inherent viscosity of 0.83 and a polymer melt temperature of 310° C. was obtained. It contained 20% by weight of methylenebis(p-cyclohexylene)terephthalamide and 80% by weight of low melting polyester units.

Film strips obtained by casting m-cresol solutions of this polymer had a tenacity of 0.42 g.p.d., an elongation of 350%, and an initial modulus of 0.50 g.p.d. This film absorbed 25% by weight of water.

Example IX

Thiodiglycol (610 grams), ethylene glycol (310 grams), and p-toluenesulfonic acid monohydrate (25 grams) were mixed with 200 ml. of toluene. This solution was refluxed and water removed azeotropically for approximately eight hours at a temperature of 110–143° C. The reaction product was washed with sodium carbonate solution and water to remove excess catalyst and reactants. The product layer was separated, centrifuged, and solvent removed from the oily layer under vacuum at approximately 90° C. The product was purified by dissolving in toluene and treating with activated carbon. The solvent was again removed under vacuum until a pressure of 0.05 mm. was obtained. The yield of product was 80%. Hydroxyl analysis showed the molecular weight of the polyoxathiaalkylene glycol to be approximately 1100.

The following ingredients were placed in a Blendor: 2.05 grams of trans-2,5-dimethylpiperazine, 3.59 grams of sodium carbonate, 50 ml. of methylene chloride, and 75 ml. of water. To this were added simultaneously a solution of 2.08 grams of terephthaloyl chloride in 50 ml. of methylene chloride, and 42 ml. of a stock solution prepared by dissolving 43.1 grams of the polyoxathiaalkylene glycol prepared above, 7.58 grams of triethylamine, and 17.95 grams of sebacyl chloride in 150 ml. of benzene.

A polymer with an inherent viscosity of 1.37 was obtained in 92% yield. This contained 22% by weight of dimethylpiperazine terephthalamide units, 15% by weight of dimethylpiperazine sebacamide units, and 63% by weight of polyoxathiaalkylene sebacate units. Films cast from a 60/40 trichloroethane/formic acid solution had the following properties: tenacity=0.09 g.p.d., elongation=638%, initial modulus=0.08 g.p.d., stress decay=11%, and tensile recovery=92%.

Example X

The following ingredients were placed in a Blendor: 2.43 grams of trans-2,5-dimethylpiperazine, 4.11 grams of sodium carbonate, 50 ml. of methylene chloride, and 75 ml. of water. To this were added with viogorous stirring a solution of 2.08 grams of terephthaloyl chloride in 25 ml. of methylene chloride and 61 ml. of the stock solution described in Example IX. A polymer with an inherent viscosity of 1.78 was obtained in 88% yield. This copolyamide ester contained 15% by weight of dimethylpiperazine terephthalamide units, 16% by weight of dimethylpiperazine sebacamide units, and 69% by weight of polyoxathiaalkylene sebacate units. Films cast from a 60/40 trichloroethane/formic acid solution had the following properties: tenacity=0.02 g.p.d., elongation=447%, initial modulus=0.03 g.p.d., stress decay=11%, and tensile recovery=90%.

Example XI

The following ingredients were charged to a Blendor: 3.11 grams of trans-2,5-dimethylpiperazine, 5.25 grams of sodium carbonate, 50 ml. of methylene chloride, and 75 ml. of water. To this were added with vigorous stirring a solution of 2.08 grams of terephthaloyl chloride in 25 ml. of methylene chloride and 101 ml. of the stock solution of Example IX. An 82% yield of a polymer with an inherent viscosity of 1.59 was obtained. This copolyamide ester contained 9% by weight of dimethylpiperazine terephthalamide units, 16% by weight of dimethylpiperazine sebacamide units, and 75% by weight of polyoxathiaalkylene sebacate units.

Example XII

A polyoxathiaalkylene glycol with a molecular weight of 1115 was prepared as described in Example IX. A stock solution (78 ml.) prepared by dissolving 66.9 grams of this glycol, 12.12 grams of triethylamine, and 42.4 grams of sebacyl chloride in 150 ml. of benzene was charged with vigorous stirring to a Blendor containing 5.37 grams of an 86.6% aqueous solution of hexamethylene diamine, 7.73 grams of sodium carbonate, 150 ml. of methylene chloride, and 100 ml. of water. Methylene chloride (50 ml.) was added while keeping the reaction mixture cool. After the reaction had subsided, the reaction mixture was allowed to stand for 16 hours. It was then filtered and the filtrate made up to 250 ml. with methylene chloride. An 86% yield of a polymer with an inherent viscosity of 1.60 was obtained. This copolyamide ester contained 30% by weight of hexamethylene sebacamide units and 70% by weight of polyoxathiaalkylene sebacate units. The polymer was melt spun at 210° C. and the filaments, after being drawn 7X, heat-set, and relaxed, had the following properties: tenacity=0.53 g.p.d., elongation=95%, initial modulus=0.52 g.p.d., stress decay=15%, and tensile recovery=92%.

Example XIII

The following ingredients were reacted with stirring: 3.84 grams of polyoxathiaalkylene glycol of the preceding example, 9.11 grams of poly(tetramethylene oxide) glycol with a molecular weight of 3300, and 7.20 grams of sebacyl chloride dissolved in 50 ml. of benzene containing 1.26 grams of triethylamine. These materials were allowed to react for three hours and the reaction mixture filtered. The filtrate was added to the following mixture in a Blendor: 3.52 grams of an 86.6% aqueous solution of hexamethylene diamine, 5.07 grams of sodium carbonate, 200 ml. of methylene chloride, and 100 ml. of water. This reaction was allowed to proceed for approximately five minutes with vigorous stirring, and the reaction mixture was poured into boiling water. An 83% yield of a polymer with an inherent viscosity of 1.22 was obtained. This copolyamide ester contained 33% by weight of hexamethylene sebacamide units, 22% by weight of polyoxathiaalklene sebacate units, and 45% by weight of poly(tetramethylene oxide) sebacate units. The polymer was melt spun at 212° C. and the filaments, after being drawn 8× and relaxed in boiling water, had the following properties: tenacity=0.44 g.p.d., elongation =340%, initial modulus=0.26 g.p.d., stress decay=16%, and tensile recovery=94%.

Example XIV

A polyoxathiaalkylene glycol with a molecular weight of 1675 was prepared as described in Example IX, except that tetramethylene glycol was substituted for ethylene glycol. To 10.38 grams of sebacyl chloride in 50 ml. of benzene were added with vigorous stirring over a period of 16 minutes a solution of 19.10 grams of the polyoxathiaalkylene glycol described above and 2.30 grams of triethylamine in 50 ml. of benzene. The reaction mixture was allowed to stand for four hours and filtered. This filtrate was reacted in a Blendor with vigorous stirring with the following mixture: 4.07 grams of hexamethylene diamine, 7.45 grams of sodium carbonate, 150 ml. of water, and 100 ml. of methylene chloride. A 93% yield of a polymer with an inherent viscosity of 1.38 was obtained. This copolyamide ester contained 27% by weight of hexamethylene sebacamide units and 73% by weight of polyoxathiaalkylene sebacate units. Films cast from a 60/40 trichloroethane/formic acid solution had the following properties: tenacity=0.10 g.p.d., elongation=267%, initial modulus=0.31 g.p.d., stress decay= 14%, and tensile recovery=91%.

Example XV

Poly(tetramethylene oxide) glycol (807 grams) with a molecular weight of 1000 was dissolved in benzene and some benzene was distilled to remove the small amount of water present. To this was then added 112 grams of hexahydroterephthaloyl chloride, and the reaction was allowed to proceed at room temperature under atmospheric pressure, using a nitrogen bleed to exclude oxygen. After the reaction was complete, hydrogen chloride and benzene were removed under reduced pressure on a steam bath to yield 1607 grams of a solution containing 879 grams of a "trimer" with hydroxyl ends.

The benzene solution (603 grams) containing the "trimer" was reacted with 38.8 grams of adipyl chloride for 18 hours at room temperature, using a nitrogen bleed to exclude oxygen. Benzene was then removed, first on a water bath under partial vacuum, and finally at 0.3 mm., using a nitrogen bleed. A solution (376 grams) containing 98.7% solids was obtained.

The "trimer" with adipyl chloride end groups from the above reaction was mixed with 2.52 grams of adipyl chloride, 5.78 grams of hexamethylene diamine, and 1.8 grams of antioxidant in 107 ml. of dioxan. This mixture was stirred vigorously in a Blendor to give a thick dough. After the reaction had run for three minutes, 51 grams of formic acid was added to the reaction mixture jacketed with an 80–95° C. water bath to produce a substantially clear solution containing 18% solids. This mixture was heated to 50° C. and extruded at 50 p.s.i. through a spinneret containing five 0.004 inch holes into a column maintained at a temperature of 175° C. The spinneret temperature was 75° C. and the air admitted to the column was heated to 140° C. Elastic filaments were wound up.

Example XVI

A mixture of 30.5 grams of propylene sulfide, 1.38 grams of beta,beta'-dimercaptodiethylether, and, as catalysts, one gram of triethylamine and one gram of S-diethylthiourea was heated at 50° C. for three hours under a blanket of nitrogen. The excess monomer was removed from the clear colorless viscous liquid under vacuum. The product was washed thoroughly with methanol to remove the cocatalysts and then dried under vacuum at 50° C. for more than six hours. A polysulfide (29.8 grams) with —SH ends having a molecular weight of 3070 was obtained. The product was soluble in benzene and chloroform but insoluble in acetone, ethanol, or methanol. Different dimercaptans can be used and other catalyst systems are operable.

This polysulfide (7.20 grams) and 2.55 grams of terephthaloyl chloride were dissolved in 50 ml. of chloroform. To this was added 0.52 grams of triethylamine dissolved in 25 ml. of chloroform. After standing overnight, the yellow solution was added with vigorous stirring to a solution containing 1.17 grams of trans-2,5-dimethylpiperazine, 2.05 grams of triethylamine and 60 ml. of chloroform. When reaction was complete, the copolymer was precipitated by pouring into hexane and water. After washing in hot water, the product had an inherent viscosity in m-cresol of 0.51 and was obtained in 90% yield. The polymer had a polymer melt temperature of 330° C. and contained 25% by weight of dimethylpiperazine terephthalamide and 75% by weight of the polythioester derived from the reaction of the dimercapto polysulfide with terephthaloyl chloride. Films were cast from 60/40 trichloroethane/formic acid solutions of the polymer. Strips of these films were drawn 5× and relaxed in boiling water. They had a tenacity of 0.11 g.p.d., an elongation of 313%, an initial modulus of 0.11 g.p.d., a stress decay of 13%, and a tensile recovery of 92%.

Example XVII

Poly(tetramethylene oxide) glycol (one mol) with a molecular weight of 1590 was reacted with 2 mols of terephthaloyl chloride. This polyether diester (38.7 grams=0.02 mol) with acid chloride ends was dissolved in 350 ml. of methylene chloride along with 6.52 grams (0.02 mol) of 1,5-naphthalenedisulfonyl chloride. A separate solution was prepared by dissolving 4.6 grams (0.04 mol) of hexamethylene diamine and 8.48 grams (0.08 mol) of sodium carbonate in 175 ml. of water. The two solutions were mixed rapidly with vigorous stirring at room temperature. After a few minutes reaction at room temperature, the polymer produced was precipitated by pouring the reaction mixture into boiling water. The polymer was filtered and washed twice with hot water and twice with methanol. The polymer was then dried under nitrogen overnight in a 70° C. vacuum oven. The dried polymer had an inherent viscosity of 0.82 in m-cresol.

The polymer was dissolved in N,N-dimethylformamide to produce a solution containing 25% solids. The solution was heated to 115° C. and extruded through a 5-hole spinneret into a column of air maintained at 190–198° C. The filaments were wound up at 164 y.p.m. After being relaxed in boiling water, the dried and conditioned filaments had the following properties: tenacity=0.32 g.p.d., elongation=811%, initial modulus=0.21 g.p.d., and denier=12.

Example XVIII

Poly(tetramethylene oxide) glycol (one mol) with a molecular weight of 1000 was reacted with 2 mols of terephthaloyl chloride. This polyether diester (40 grams=0.03 mol) was dissolved in 100 ml. of dry benzene along with 5.61 grams (0.03 mol) of ethylene bischloroformate. A separate emulsion was prepared by mixing the following ingredients: 5.77 grams (0.067 mol) of piperazine, 180 ml. of water, 11 ml. of chloroform, and 15 ml. of benzene. The emulsion was cooled to 10° C. and mixed rapidly with vigorous stirring with the solution of acid chlorides. Stirring was continued for five minutes while the reaction warmed up to room temperature. The polymer was precipitated as a thick paste by adding 250 ml. of acetone. The paste-like mass was poured into boiling water to precipitate the polymer. The organic solvents were removed by distillation and the polymer separated by filtration. The polymer was washed again with boiling water, filtered, and dried under nitrogen overnight in a 60° C. vacuum oven. A dried polymer with an inherent viscosity in m-cresol of 2.00 was obtained in 88% yield.

A spinning solution containing 15% solids was prepared by dissolving the polymer in 1,1,2-trichloroethane. The solution was extruded and the slightly tacky, freshly extruded filaments were talced prior to winding up. After relaxing in boiling water, the filaments had the following properties: tenacity=0.11 g.p.d., elongation=771%, initial modulus=0.03 g.p.d., and denier=11.

Example XIX

Poly(tetramethylene oxide) glycol (32.0 grams) with a molecular weight of 1600 was mixed with 8.12 grams of terephthaloyl chloride in 300 ml. of dry benzene and the mixture heated with stirring at 40–50° C. for 16 hours under a nitrogen atmosphere. The benzene was removed and the polyether diester with acid chloride ends was dissolved in 350 ml. of methylene chloride along with 4.78 grams of the biscarbamylchloride of 2,5-dimethylpiperazine. A separate solution was prepared by dissolving 4.64 grams of hexamethylene diamine and 9.00 grams of sodium carbonate in 200 ml. of water. The two solutions were mixed rapidly with vigorous stirring and stirring continued for five minutes at room temperature. The reaction mixture was poured into hot water to precipitate the polymer. The chloroform was removed by distillation and the polymer separated and washed with water and methanol. The dry polymer with an inherent viscosity in m-cresol of 2.2 and a polymer melt temperature of 290° C. was obtained in 95% yield.

The polymer was dissolved in a 60/40 mixture of 1,1,2-trichloroethane/formic acid mixture to produce a solution containing 27% solids. The solution was heated to 80° C. and extruded through a 5-hole spinneret. After being relaxed in boiling water, the filaments had the following properties: tenacity=0.26 g.p.d., elongation=1040%, initial modulus=0.16 g.p.d, stress decay=13%, tensile recovery=92%, and fiber stick temperature=155–157° C.

Example XX

A mixture of 39.6 grams of N,N'-dimethylhexamethylenediamine, 47.3 grams of N,N'-diethylhexamethylenediamine, and 220 grams of calcium hydroxide are dispersed in 2500 ml. of dry benzene. To this dispersion is added a solution of 143 grams of the bischloroformate of 2,2-dimethyl-1,3-propanediol in 2500 ml. of dry benzene. The solution is added slowly and the reaction mixture stirred overnight at room temperature. The reaction mixture is filtered, and the benzene is removed from the filtrate by distillation. To the residue is added 2500 ml. of acetone, 600 ml. of water and 35 grams of sodium carbonate, and the mixture is refluxed overnight. Acetone and water are distilled off, 2500 ml. of benzene is added, and the reaction mixture is filtered to remove insoluble calcium hydroxide/calcium chloride. The filtrate is concentrated, and the residual viscous liquid is heated at 100° C. at 1 mm. pressure for 16 hours. The hydroxyl-terminated N-alkylated copolyurethane, obtained in 93% yield, is a white, viscous liquid containing by analysis 520 hydroxyl groups per million grams of polymer and 4 amino groups per million grams, corresponding to a molecular weight of approximately 3800.

The above-described N-alkylated copolyurethane (19.0 grams) is reacted with stirring with 5.5 grams of terephthaloyl chloride and 8.0 grams of 2,5-dimethylpiperazine in 250 ml. of chloroform. There is obtained in 90% yield a solution of segmented polymer having an inherent viscosity of 1.9. The segmented polymer contains approximately 75% by weight of N-alkylated copolyurethane linked through ester groups to segments of a poly(dimethylpiperazine terephthalamide). The solution is dry spun in the usual manner to yield elastic fibers with the following properties: tenacity 0.48 g.p.d., elongation 800%, initial modulus 0.03 g.p.d., tensile recovery 95%, stress decay 5%, fiber stick temperature 220° C.

Example XXI

A solution of 10.25 grams of poly(tetramethylene oxide) glycol having a molecular weight of about 1000 and 2.0 grams of triethylamine in 75 ml. of benzene is treated with 3.0 grams of isophthaloyl chloride at 0° C. After standing for four hours at room temperature the solution is filtered and the solvent evaporated from the filtrate under vacuum. The residue of polyether having acid chloride end groups together with 1.02 grams of isophthaloyl chloride is treated at 0° C. with a solution of 1.08 grams of m-phenylenediamine in 30 ml. of dry dimethylacetamide. After 10 minutes at 0° C. the mixture is kept at room temperature for one hour. The polymer is precipitated in excess glycerol with stirring, washed with water, and dried under vacuum at 60° C. There is obtained 13.78 grams (99% yield) of a polymer having an inherent viscosity of 1.26. The polymer contains approximately 17% by weight of m-phenylene isophthalamide units and 83% by weight of the low melting polyether segments.

Dimethylacetamide solutions of the polymer are cast into elastic films having the following properties: tenacity 0.16 g.p.d., elongation 518%, initial modulus 0.15 g.p.d., tensile recovery 94%, stress decay 12%.

"Polymer melt temperature" is the minimum temperature at which a sample of the polymer leaves a wet, molten trail as it is stroked with moderate pressure across a smooth surface of a heated brass block. "Polymer melt temperature" has sometimes in the past been referred to as "polymer stick temperature." "Fiber stick temperature" is the temperature at which the fiber will just stick to a heated brass block when held against the surface of the block for five seconds with a 200 gram weight. The "zero strength temperature" is the average temperature at which the two ends of the fiber break if heating is continued with the weight left on after the fiber stick temperature has been determined. "Initial modulus" is determined by measuring the initial slope of the stress-strain curve. The tenacity and modulus in the examples are expressed in units of grams per denier (g.p.d.).

The diamines useful in the formation of the "hard" segments of the segmented polymers are any primary or secondary aliphatic, alicyclic, heterocyclic, or aromatic diamine as long as it is properly combined with a complementary monomer to form units of a polymer which melts above 200° C. when its molecular weight is in the fiber-forming range. As representative examples may be mentioned: ethylenediamine, propylenediamine, tetramethylenediamine, pentamethylenediamine, hexamethylenediamine, heptamethylenediamine, octamethylenediamine, p-xylylenediamine, 1,4-diaminocyclohexane, p-phenylenediamine, 1-methyl-2,4-diaminobenzene, bis-(p-aminocyclohexyl) methane, N,N'-dimethyltetramethylenediamine, N,N'-dimethylphenylenediamine, N,N'-dimethyl-p-xylylenediamine, N,N'-dimethyl - 1,4 - diaminocyclohexane, piperazine, and trans-2,5-dimethylpiperazine. The examples describe the utilization of some of these diamines. Mixtures of diamines may be used as well. Ethylenediamine, hexamethylenediamine, piperazine, and 2,5-dimethylpiperazine have been found particularly valuable for preparing many useful compositions falling within the scope of this invention. The bis-carbamyl derivatives, e.g., those prepared from phosgene and any of the diamines listed, may be used to prepare suitable urea polymers. In addition, non-functional derivatives of the diamines listed may also be used as long as the substituents do not interfere with the polymerization. For example, the diamines may have hydrocarbon side chains or be substituted with halogen or nitro groups, which are inert under the conditions used herein.

Any difunctional acid or its polyamide-forming derivatives may be used as a complementary monomer. This includes aliphatic, aromatic, mixed aliphatic-aromatic, and alicyclic dicarboxylic and disulfonic acids and both of these types of acids containing heterocyclic rings. Mixtures of and mixed carbonic and sulfonic acids or their polyamide-forming derivatives may be used. As specific examples of the useful acids may be mentioned succinic, adipic, suberic, sebacic, terephthalic, hexahydroterephthalic, isophthalic, phthalic, bibenboic, 1,5-naphthalenedicarboxylic or sulfonic acids, piperazinediacetic acid, m-benzene-disulfonic acid, hexanedisulfonic acid, and 1,2-ethane-disulfonic acid. The acids may also be substituted with groups which do not interfere with the reaction. The only important limitation is that the acids must be combined with a properly selected diamine to form units of a polymer which has a polymer melt temperature of above 200° C. in the fiber-forming molecular weight range. As is shown in the examples, the acid halides have been found to be very useful ester-forming derivatives. Adipic, sebacic, terephthalic, hexahydroterephthalic, and 1,5-naphthalenedisulfonic and dicarboxylic acids and their derivatives have been found to be particularly useful.

The bis(haloformates) used with a diamine to form polyurethanes in the high melting segment can be prepared from any glycol or dihydroxy compound. This includes aliphatic, aromatic, mixed aliphatic-aromatic, cycloaliphatic, and difunctional hydroxy compounds containing heterocyclic rings. As specific examples may be mentioned the bis(haloformates) of ethylene glycol, propylene glycol, butylene glycol, o-, m-, and p-xylylene glycols, cyclohexanediol, hydroquinone, resorcinol, catechol, 4-methyl-resorcinol, among others. As was the case with the diamines, mixtures of the bis(haloformates) may be used, or they may be substituted with groups which do not interfere with the reaction.

The nature of the difunctional macrointermediates has been discussed briefly earlier. The functional groups may be separated by hydrocarbon, polyester, polyether, polyoxathiaalkylene, polysulfide, polysiloxane, polyurethane, certain polyamides, and similar types of chains. These chains may contain aromatic groups, and they may be substituted with halogen, alkyl, nitro, alkoxy, and similar groups which are not reactive under the particular polymerization conditions being used. The important consideration, as indicated earlier, is that the macrointermediate be difunctional and melt below about 50° C. Where the melting point of the macrointermediate is not sufficiently low or is borderline, a plasticizer having affinity selectively for the macrointermediate may be blended into the final segmented polymer in order to produce an elastic material from an otherwise non-elastic, segmented polymer, or in order to upgrade the elastic properties of an otherwise mediocre polymer. For example, the addition of 3–5% of a polymeric plasticizer, poly(propylene oxide) glycol having a molecular weight of about 2000, to a segmented polymer the macrointermediate of which is a poly(tetramethylene oxide) glycol having a molecular weight of about 3000, greatly improves the elastic properties of the segmented polymer by virtue of the selective affinity of the plasticizer for the polyether segments of the elastomer.

Hydrocarbon chains suitable as macrointermediates include those derived from polyisobutylene. Polyisobutylene dicarboxylic acids can be prepared by the nitric acid oxidation of butadiene-isobutylene copolymers. In butadiene-isobutylene copolymers with small percentages of butadiene there are large segments of isobutylene separated by butadiene units, each butadiene unit having a double bond after polymerization. The polyisobutylene segments in copolymers containing approximately 1% unsaturation have molecular weights of 3000–4000. If these copolymers are oxidized with nitric acid, the double bonds are attacked and the products isolated are difunctional macromolecules which are essentially polyisobutylene with carboxyl ends. These products have an average molecular weight of 3300 to 3500 and good difunctionality as indicated by the agreement between the ebullioscopic molecular weight and the molecular weight calculated from end-group analysis.

Low molecular weight polyesters can be prepared by reacting acids, esters, or acid halides with glycols. Suitable glycols are the polymethylene glycols, e.g., ethylene, propylene, butylene, decamethylene, etc. Dimercaptans may also be used to prepare thioesters. These glycols and/or dimercaptans may be reacted with the proper mol ratio of aliphatic, cycloaliphatic, or aromatic acid or ester-forming derivatives to produce low molecular weight polymers. Suitable acids for preparing polyesters and/or copolyesters are succinic, adipic, suberic, sebacic, isophthalic, hexahydroterephthalic; the alkyl and halogen-substituted derivatives of these acids may also be used. The diacid halide derivatives of these acids have been useful in preparing "dimers" and "trimers" (i.e., low molecular weight polymers containing two or three macro glycol units) with acid halide ends, which have been particularly useful for preparing polymers by solution or interfacial polymerization methods.

In respect to the halogen compounds referred to such as acid halides and bis(haloformates), the halogen may be chlorine, bromine, iodine, or fluorine. Generally, this will be chlorine.

Polysiloxanes with molecular weights of 3000–4000 are another useful class. The first step in the preparation is the polymerization of dihalodialkylsilanes in the presence of a monobromoalkyl- or monobromoaryl-dialkylhalosilane. In general, the molecular weight of these bromine-terminated polysiloxanes is determined by the amount of chain terminator used. They are converted to nitriles and hydrolyzed to the corresponding acids prior to use in this process.

Polyurethanes having terminal hydroxyl groups also are useful as macrointermediates for this invention. Within this class the use of N-alkylated polyurethanes derived from secondary diamines is preferred. Such N-alkylated polyurethanes with the required difunctionality may be prepared by reacting the bischloroformate of a glycol with a secondary diamine in an organic solvent free of water and in the presence of an excess of metalliferous base, such as calcium hydroxide.

Preferred difunctional intermediates are those derived from the polyethers. Representative difunctional polyethers which may be used include the polyoxathiaalkylene glycols, such as poly(1,6-dioxa-9-thiahendecane), poly(1,4-dioxa-7-thianonane), and poly(1-oxa-4-thiahexane); the poly(alkylene oxide) glycols, such as poly(ethylene oxide) glycol, poly(propylene oxide) glycol, poly(tetramethyleneoxide) glycol, and poly(decamethylene oxide) glycol; the dicarboxymethyl derivatives of poly(tetramethylene oxide)

HOOCCH$_2$(OCH$_2$CH$_2$CH$_2$CH$_2$)$_x$OCH$_2$COOH or its esters; polydioxolane and polyformals prepared by reacting formaldehyde with glycols or mixtures of glycols, such as tetramethylene glycol and pentamethylene glycol. Some of the alkylene radicals in these polyethers may be substituted by arylene and/or cycloalkylene radicals.

The usefulness of this type of intermediate has been demonstrated in the examples. Preferably, these polyethers are converted to other types of difunctional molecules and used in the modified form, but they may be used as the glycols, the form in which they are usually obtained. For example, these glycols may be converted to diacid halides by reacting the glycol with two mols of a diacid halide to give a polyether diester with acid halide ends.

The preferred difunctional polyethers are the poly(alkylene oxide) glycols, which may be represented by the formula:

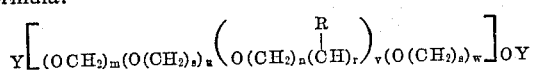

in which $m$ and $r$ are 0 or 1; $n$ is 2–10 when $r$ is 0 and 1–9 when $r$ is 1; $s$ is 0–10, $u$ and $w$ are 1–50; $v$ is 4–125; R is H or a low molecular weight alkyl group such as methyl; and Y is H or a terminating group with reactive ends capable of forming an ester linkage, such as —OH, —COOH, or —COCl.

The preferred macrointermediate of this type is poly(tetramethylene oxide) glycol and/or its derivatives. Particularly useful are the segmented polymers formed with the following ingredients: (1) dimethyl piperazine and terephthalic acid, (2) hexamethylene diamine and adipic acid, (3) hexamethylene diamine and sebacic acid, and (4) hexamethylene diamine or ethylenediamine and terephthalic acid. The elastomers derived from this glycol, and particularly from these compositions, are of particular interest.

In this invention, several polymer structures, such as urethane, amide, and urea, and a number of different types of macromolecular chains, such as polyhydrocarbons, polysiloxanes, polyethers, and polyesters, have been found to give similar products. Under most circumstances, this would not be true, but the melting point limitations placed on the high melting segments and the melting point and molecular weight limitations placed on the macromolecular segments and the limitations placed on the linkage between these two segments has eliminated many of the differences in properties which would normally be apparent if one attempted to substitute one of these groups or structures for another in the polymers of the prior art. Furthermore, this work was directed largely toward preparing polymers which would be satisfactory as filaments, although this is obviously not the only application for these polymers. The requirements for filament formation are sufficiently stringent that the polymers of this invention are similar in properties. This is particularly true when the requirements for elastic copolymers are included.

Three methods for preparing these polymers have been described in the examples. These are: (1) melt polymerization, (2) interfacial polymerization, and (3) solution polymerization. Melt polymerization is a well-known method for preparing polymers, particularly polyamides. The only point which needs special consideration here is that melt polymerization should not be used when the difunctional macromolecule contains exchangeable linkages.

Interfacial polymerization has rapidly been attaining increased importance in the polymer field. It is a rapid, moderate temperature reaction in which the reactants are brought together in such a way that the reaction zone is at, or is immediately adjacent to, a liquid-liquid interface. Thus, most of the molecules of at least one of the reactants must diffuse through liquid diluent to arrive at the reaction zone. For example, the reactants in one liquid phase may be one or more of the diamines and the reactants in the other liquid phase may be one or more diacid halides. The two liquid phases are mixed to form a two-phase system in which the diamine and the diacid halide are in separate phases, at least one of which includes a liquid diluent. Preferably, a reactant is a liquid under the reaction conditions or is dissolved in a diluent, but one of the reactants may be dispersed or suspended as a finely divided solid in a diluent which will dissolve it at least partially. The phases are mixed until the desired condensation polymerization has taken place and then if desired, the polymers obtained are isolated. In the foregoing discussion the term "diacid halide" is intended to include the biscarbamyl halides and the acid halide derivatives of dicarboxylic and disulfonic acids derived from either the small or the large molecules. It is also intended to cover the bis(haloformates) of the small molecules. Although these materials are not completely equivalent in their behavior, they have been grouped together here to simplify the discussion.

Low molecular weight polymers have been prepared for some time by forming a homogeneous solution of the reactant and allowing the reaction to continue at moderate temperatures or heating to produce the polymers. However, only recently have high molecular weight polymers been prepared successfully by this method. The method used here for preparing polymers involves dissolving one or more reactants in a solvent and two or more complementary reactants in separate portions of the same solvent, and then mixing the solution in the presence of a suitable acid acceptor to form high molecular weight polymers. The molecular weight of the polymers is controlled by the choice of the solvent medium or by the use of mixtures of appropriate solvents. The solvent is one which is inert to the reactants.

For optimum results the segmented polymers or copolymers of this invention should have an inherent viscosity on the order of 0.6–4.0 or above, although copolymers having inherent viscosities as low as 0.4 are useful. Polymers in the lower molecular weight range are useful in certain applications, such as in the preparation of coatings and molded objects. However, the ones of particular interest are those with molecular weights in the fiber-forming range, i.e., above about 10,000. Inherent viscosity is defined as:

$$\frac{\ln \eta_r}{C}$$

in which $\eta_r$ is the viscosity of a dilute solution of the polymer divided by the viscosity of the solvent in the same units and at the same temperature, and C is the concentration in grams of the polymer per hundred ml. of solution. The inherent viscosities recorded here were measured in m-cresol or trichloroethane/formic acid mixtures. In most cases, a concentration of 0.5 gram per 100 ml. of solution was used. When the polymers are prepared by melt polymerization, they can be extruded in ribbon form upon a cold wheel and cut into small chips after the molten polymer has reached the desired intrinsic viscosity. When polymers are prepared by the interfacial or solution methods, the polymer frequently separates as soon as it has reached an adequate molecular weight value. If this does not happen, the polymer can be separated by the addition of a precipitating and/or coagulating agent. However, it is possible to prepare concentrated solutions of many of these polymers by the use of these techniques, and such solutions can be used directly in the preparation of filaments, films, ribbons, bristles, and similar articles.

This invention represents an important development in that it demonstrates for the first time a method for preparing polymers of this type which have both a high polymer melt temperature and a low second order or glass transition temperature. A number of rubbery polymers with relatively low second order transition temperatures have been prepared. These polymers have invariably had low polymer melt temperatures and tended to creep on extension. Therefore, it has usually been necessary to cross-link them in order to obtain good elastic properties. These limitations have restricted their usefulness. For example, the insolubility and infusibility of cross-linked products makes subsequent processing difficult. Polymers with high polymer melt temperatures also have had, in the past, high second order transition temperatures, which means that they tend to be non-elastic at room temperatures. The second order transition temperatures can be lowered and the room temperature elasticity correspondingly increased through copolymer formation. However, this has invariably led to a large drop in the polymer melt temperature. For example, the second order transition temperature of poly(ethyleneterephthalate) can be reduced from $+80°$ C. to $-20°$ C. by incorporation of sufficient sebacic acid to give a copolymer containing 60% by weight of ethylene sebacate units but, at the same time, this results in an undesirable drop in the polymer melt temperature from 250° C. to 115° C. In sharp contrast to this, 80% by weight of poly(tetramethylene oxide) can be incorporated into poly(hexamethylene adipamide) and lower the second order transition temperature from $+60°$ C. to $-70°$ C. while lowering the polymer melt temperature from 260° C. to 200° C., a drop of only 60°.

The copolymers of this invention have properties which make them useful in many applications. Thus, they can be molded to form a variety of shaped objects, extruded to form rods, bars, tubes, films, filaments, fibers, bristles, and the like. In film form they are useful as shoe-upper leather replacements or for use in shoe soles and heels, or as safety glass interlayers. The filaments are useful in such applications as fabrics, rope, papers, felts, among other uses.

The elastic copolymers are a particularly desirable feature of this invention. The best compositions of this invention exhibit stress decay properties nearly equivalent to those of rubber. The higher tenacity, higher initial modulus, superior abrasion resistance, and more easily controlled elongation of these polymers fit them for many applications, particularly in film and filament form, for which rubber is undesirable. Most of these copolymers possess the important additional advantage that they are easily fabricated. A large percentage of the rubber threads used are prepared by slitting rubber sheets. This produces relatively large denier non-uniform filaments, which can not be converted readily into multifilaments and are not acceptable for many uses, particularly in certain fabrics. Finer denier monofilaments and multifilaments can be prepared by extruding and coagulating rubber dispersions, but this process has proved to be expensive and the product is frequently unsatisfactory. Both types of rubber filaments have poor abrasion resistance.

Some of these copolymers also possess the desirable characteristic of being hydrophilic. The ability to absorb moisture is desirable for a textile fiber, because the fabrics made from them are more comfortable to wear. The low moisture absorption of many of the hydrophobic fibers now available is undesirable in many applications. A polymer with high water absorption characteristics also has interesting applications in film form, particularly as a replacement for leather in shoe uppers.

Although these copolymers possess many desirable properties, it is sometimes necessary to stabilize certain of the compositions to heat or radiation by ultra-violet light. Fortunately, this can be done very readily by incorporating stabilizers. Satisfactory stabilizers comprise phenols and their derivatives, amines and their derivatives, compounds containing both hydroxyl and amine groups, hydroxyazines, oximes, polymeric phenolic esters, and salts of multivalent metals in which the metal is in its lower valence state. An extensive list of suitable stabilizers is given in British Patent No. 779,054.

One of the important advantages of the polymers of this invention is that they are sufficiently stable to be melt-spun. Conventional procedures can be used for preparing films and filaments from these polymers. The elastic compositions are frequently tacky when freshly spun and require lubricating or talcing prior to winding up.

The other classical methods for shaping polymers can also be adapted quite readily to these polymers. For example, filaments can be prepared readily by dry spinning in conventional equipment. Talcing or lubricating is usually required for the elastic filaments but this does not represent a serious limitation. Solvents which have been found satisfactory for preparing solutions of suitable concentration for dry spinning are N,N-dimethylformamide, N,N-dimethylacetamide, tetramethylenesulfone, formic acid, and 60/40 1,1,2-trichloroethane/formic acid mixtures. Spinning speeds are usually lower than those used in some commercial dry spinning processes for textile filaments, although speeds in excess of 300 yards per minute have been attained with elastic filaments. This represents excellent productivity for filaments of this type. Spinning speeds are usually lower when wet spinning is used, but wet spinning processes have a definite advantage when larger denier filaments are being prepared. A preferred solvent for wet spinning is N,N-dimethylformamide and these solutions are usually extruded into a hot water bath.

When stable dispersions of these polymers (particularly the elastomers) can be prepared, the dispersion can be extruded and a shaped article prepared by coagulating the dispersion and coalescing the polymer particles. In some instances, heat coalescence is satisfactory, whereas for other polymers a solvent will have to be used to promote coalescence. Shaping and polymerization can also be combined into a single step. Although a drawing operation is not essential, the over-all properties of the films and filaments prepared from many of these copolymers are improved by a cold drawing operation which results in increased orientation and crystallinity in the final structure. Therefore, prior to final packaging, the yarns may be drawn at a suitable draw ratio, for example 2 to 10×, for the particular copolymer and relaxed, to give a product with a desired combination of tenacity, initial modulus, yarn elongation, elasticity, and similar properties.

The elastic polymer yarns of this invention are characterized by higher strength and stretch modulus and substantially better abrasion resistance than any rubber threads known. Stretch modulus measures the force required to elongate the yarn a given percentage. A garment of yarns having high tenacity and high stretch modulus will not only be durable but will also exert substantial pressure on the body of the wearer after the garment is stretched into position as desired, for example, in surgical stockings. Yarns of this invention have many advantages over rubber threads. For example, they may be spun readily into multi-filament yarns and into low denier filaments. They have superior abrasion resistance, a very low inherent color, may be dyed by common dyestuffs, need no plasticizers which might later be leached out of the yarn, and have a good resistance to perspiration or greases and many other common chemicals. Furthermore, these elastic yarns are capable of very quick elastic recovery, a property which is lacking in many of the so-called elastic fibers.

Yarns from the elastic polymers of this invention are useful in woven, knitted, and non-woven fabrics for use in universal fitting apparel (socks, polo shirts, underwear, bathing suits, gloves, elastic cuffs, sweaters, waistbands, suits, coats, dresses, skirts, action sportswear, leotard-type outerwear, and accessories such a tapes, webbings and other woven, non-woven or knit apparel fabrics), household products (form-fitting upholstery, slip covers, sheets, carpets, mattress coverings, and narrow tapes and webbings for a wide variety of uses), industrial products (transportation upholstery, woven and nonwoven felts, tapes and webbings for varied applications), and medical products (surgical bandages, supports, elastic dressings, surgical stockings, and splint tapes).

The elastic properties attained by this invention result in part from the novel combination of a segment of a "hard" or high melting polymer with a "soft" or low melting polymeric segment. The polymers from which the former segments are derived all melt above 200° C., some melting points being exemplified as follows: poly(hexamethylene sebacamide), 209° C.; poly(hexamethylene adipamide), 250° C.; polyurethane from piperazine and ethylene bis(chloroformate), 245° C.; polyurethane from piperazine and the bis(chloroformate) of 1,4-cyclohexanediol, 275° C.; poly(p,p'-methylenediphenyl urea), 305° C.; and poly(4-methyl-m-phenylene urea), 400° C. with decomposition. The melting points of the polyether glycols are below about 50° C., as for example, poly(tetramethylene oxide) glycol having an average molecular weight of 1000, about 20° C.; poly(tetramethylene oxide) glycol having a molecular weight of 1500, about 30° C.; and poly(tetramethylene oxide) glycol of 3000 molecular weight, about 40° C. The melting points of the polyether glycols are generally not sharp and may vary for a given molecular weight. Thus, some samples of the higher molecular weight polyether glycols may have apparent melting points as high as 55° C. The dicarboxylic acids derived from the isobutylene/butadiene copolymers are semi-solids at room temperature. The "hard" segments may be combined with the low melting segments to produce a large number of the elastomers of this invention.

It will be apparent that many widely different embodiments of this invention may be made without departing from the spirit and scope thereof, and therefore it is not intended to be limited except as indicated in the appended claims.

We claim:
1. A substantially linear segmented copolymer consisting of a multiplicity of intralinear segments of two classes connected by ester linkages, the segments of the first class being the residues remaining after removal of the terminal ester-forming functional groups selected from the group consisting of hydroxyl, thiol, carboxyl, and acid halide from a difunctional polymer having a melting point below about 50° C. and a molecular weight above about 600, and the segments of the second class containing at least one repeating unit of a fiber-forming polymer, said repeating unit being of the formula —B—Q—A—Q—, wherein —A— and —B— are bivalent organic radicals, the radical —A— containing terminal nitrogen atoms to each of which is attached one of the indicated free valences of the said radical —A—, and Q is a bivalent radical selected from the group consisting of

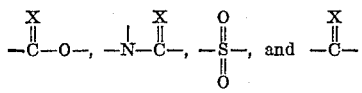

the said fiber-forming polymer having a melting point above about 200° C. in the fiber-forming molecular weight range, said segments of the second class being connected by ester linkages selected from the group consisting of

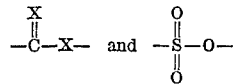

wherein X is selected from the group consisting of oxygen and sulfur, to terminal carbon atoms of the segments of the first class, with the proviso that said copolymer be free of nitrogen-to-nitrogen bonds in the polymer chain, said segments of the first class constituting from about 60% to about 90% by weight of said segmented copolymer.

2. A substantially linear segmented copolymer consisting of a multiplicity of intralinear segments of two classes connected by ester linkages, the segments of the first class being the residues remaining after removal of the terminal ester-forming functional groups selected from the group consisting of hydroxyl, thiol, carboxyl, and acid halide from a difunctional polymer having a melting point below about 50° C. and a molecular weight above about 600, and the segments of the second class containing at least one repeating unit of a fiber-forming polymer, said repeating unit being of the formula

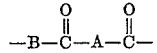

wherein —A— and —B— are bivalent organic radicals, the radical —A— containing terminal nitrogen atoms to each of which is attached one of the indicated free valences of the said radical —A—, the said fiber-forming polymer having a melting point above about 200° C. in the fiber-forming molecular weight range, said segments of the second class being connected by ester linkages of the formula

to the terminal carbon atoms of the segments of the first class, with the proviso that said copolymer be free of nitrogen-to-nitrogen bonds in the polymer chain, said segments of the first class constituting from about 60% to about 90% by weight of said segmented copolymer.

3. The copolymer of claim 2 wherein said difunctional polymer is a polyester.

4. A process for preparing a synthetic linear segmented copolymer which comprises reacting a difunctional polymer having a molecular weight of at least about 600 and a melting point below about 50° C. and having terminal ester-forming functional groups selected from the group consisting of hydroxyl, thiol, carboxyl, and acid halide with at least two difunctional complementary organic monomers capable of independently forming together a linear fiber-forming polymer having a melting point above about 200° C. in the fiber-forming molecular weight range, at least one of said monomers having two reactive functional groups capable of forming ester linkages with the functional groups of said difunctional polymer and at least one of said monomers being selected from the group consisting of organic primary and secondary diamines, said difunctional polymer being present in the final product in an amount from about 60% to about 90% by weight.

5. A process for preparing synthetic linear segmented copolymers which comprises reacting a difunctional polyether glycol with at least two difunctional complementary organic monomers capable of independently forming together a linear fiber-forming polymer having a melting point above about 200° C. in the fiber-forming molecular weight range, at least one of said monomers having two reactive functional groups capable of forming ester linkages with said polyether glycol and at least one of said monomers being selected from the group consisting of organic primary and secondary diamines, said polyether glycol being present in said reaction to provide from about 60% to about 90% by weight of the final product.

6. The process of claim 5 wherein said polyether glycol is a poly(alkylene oxide) glycol.

7. The process of claim 6 wherein said polyether glycol is a poly(tetramethylene oxide) glycol.

8. A process for preparing synthetic linear segmented copolymers which comprises reacting a difunctional hydroxyl-terminated polymer having a molecular weight of at least about 600 and a melting point below about 50° C. with a diacid halide in a molar ratio not greater than 1:2 to provide a macro-intermediate having terminal acid halide groups and thereafter reacting said macro-intermediate with an organic diamine, said organic diamine and said diacid halide being complementary monomers capable of forming a linear fiber-forming polyamide having a melting point above about 200° C. in the fiber-forming molecular weight range, said difunctional polymer being present in the final product in an amount from about 60% to about 90% by weight.

9. The copolymer of claim 2 in which the said difunctional polymer is a polyether glycol.

10. The copolymer of claim 9 in which the polyether glycol is a poly(alkylene oxide) glycol.

11. The copolymer of claim 10 in which the polyether glycol is a poly(tetramethylene oxide) glycol.

12. A shaped article made from a copolymer of claim 2 having an elastic recovery above about 90% and a stress decay of less than about 20%.

13. A filament made from a copolymer of claim 2.

14. A filament of claim 13 having a fiber-stick temperature above about 150° C.

15. A film made from a copolymer of claim 2.

References Cited in the file of this patent

UNITED STATES PATENTS

| | | |
|---|---|---|
| 2,333,923 | Gray | Nov. 9, 1943 |
| 2,360,673 | Hanford | Oct. 17, 1944 |
| 2,386,445 | De Groote | Oct. 9, 1945 |
| 2,547,113 | Drewitt et al. | Apr. 3, 1951 |
| 2,621,166 | Schmidt et al. | Dec. 9, 1952 |
| 2,692,253 | Holmen | Oct. 19, 1954 |

FOREIGN PATENTS

| | | |
|---|---|---|
| 878,713 | Germany | June 5, 1953 |

UNITED STATES PATENT OFFICE
CERTIFICATE OF CORRECTION

Patent No. 3,044,987

July 17, 1962

John Raymond Schaefgen et al.

It is hereby certified that error appears in the above numbered patent requiring correction and that the said Letters Patent should read as corrected below.

Column 21, line 16, for the claim reference numeral "2" read -- 1 --.

Signed and sealed this 13th day of November 1962.

(SEAL)
Attest:

ERNEST W. SWIDER
Attesting Officer

DAVID L. LADD
Commissioner of Patents